United States Patent [19]

Hiraishi

[11] Patent Number: 4,645,914
[45] Date of Patent: Feb. 24, 1987

[54] CARD READER

[75] Inventor: Tomiyasu Hiraishi, Kochi, Japan

[73] Assignee: Omron Tateisi Electronics Co., Kyoto, Japan

[21] Appl. No.: 712,448

[22] Filed: Mar. 18, 1985

[30] Foreign Application Priority Data

Mar. 16, 1984 [JP] Japan .............................. 59-38743[U]

[51] Int. Cl.$^4$ .............................................. G06K 5/00
[52] U.S. Cl. ..................................... 235/380; 235/382; 235/477
[58] Field of Search ......................... 235/380, 382, 477

[56] References Cited

U.S. PATENT DOCUMENTS 4,538,056  8/1985  Young ............................. 235/382 X Primary Examiner—Harold I. Pitts
Attorney, Agent, or Firm—Stevens, Davis, Miller & Mosher

[57] ABSTRACT

A card reader capable of conveying a card inserted therein to a predetermined position for accessing the card with respect to the data on the card. Non-volatile storage means are adapted to be set when the inserted card is conveyed to the predetermined position and react when the card is returned to its original position, power failure detecting means for detecting power failure when the non-volatile storage means is set, and driving means for returning the inserted card to its original position in response to an output generated from the power failure detecting means.

3 Claims, 3 Drawing Figures

FIG. I

CARD READER

BRIEF SUMMARY OF THE INVENTION

This invention relates to a card reader which may be employed in a transaction device, and more particularly to an improved card reader capable of returning a card on power failure.

A card reader is well known which is employed in a banking transaction terminal accessed by a customer. A card inlet of the card reader is disposed on a customer operation panel of the terminal to receive a card inserted by a customer for reading data stored on a magnetic stripe of the received card which is taken within the terminal unaccessible by the customer. Upon completion of a transaction desired by the customer, the taken-in card is returned to him. The card reader is, however, inconvenient to the customer when a power failure occurs because the power supply to the card reader is so interrupted on the power failure that the card taken in the terminal may not be returned to him It is more inconvenient when the power failure occurs in a no clerk attendance automatic transaction terminal or after bank service is closed because he must go to a branch of the bank on another day.

It is therefore an object of this invention to provide a card reader having a back up battery so that a card positioned within the reader may be returned to an operator even on power failure occurrence.

It is a further object of this invention to provide a card reader so that a transaction terminal employing the reader automatically returns any inserted card within the terminal to the card operator whenever power failure occurs.

According to this invention there is provided a card reader capable of conveying a card inserted therein to a predetermined position for accessing the card with respect to the data on the card, which comprises non-volatile storage means for being adapted to be set when the inserted card is conveyed to the predetermined position and reset when the card is returned to its original position, power failure detecting means for detecting power failure when the non-volatile storage means is set, and driving means for returning the inserted card to its original position in response to an output generated from the power failure detecting means.

Other objects and advantages of this invention will become apparent from the following description in conjunction with the accompanying drawings, in which:

DETAILED DESCRIPTION

Figure 1:
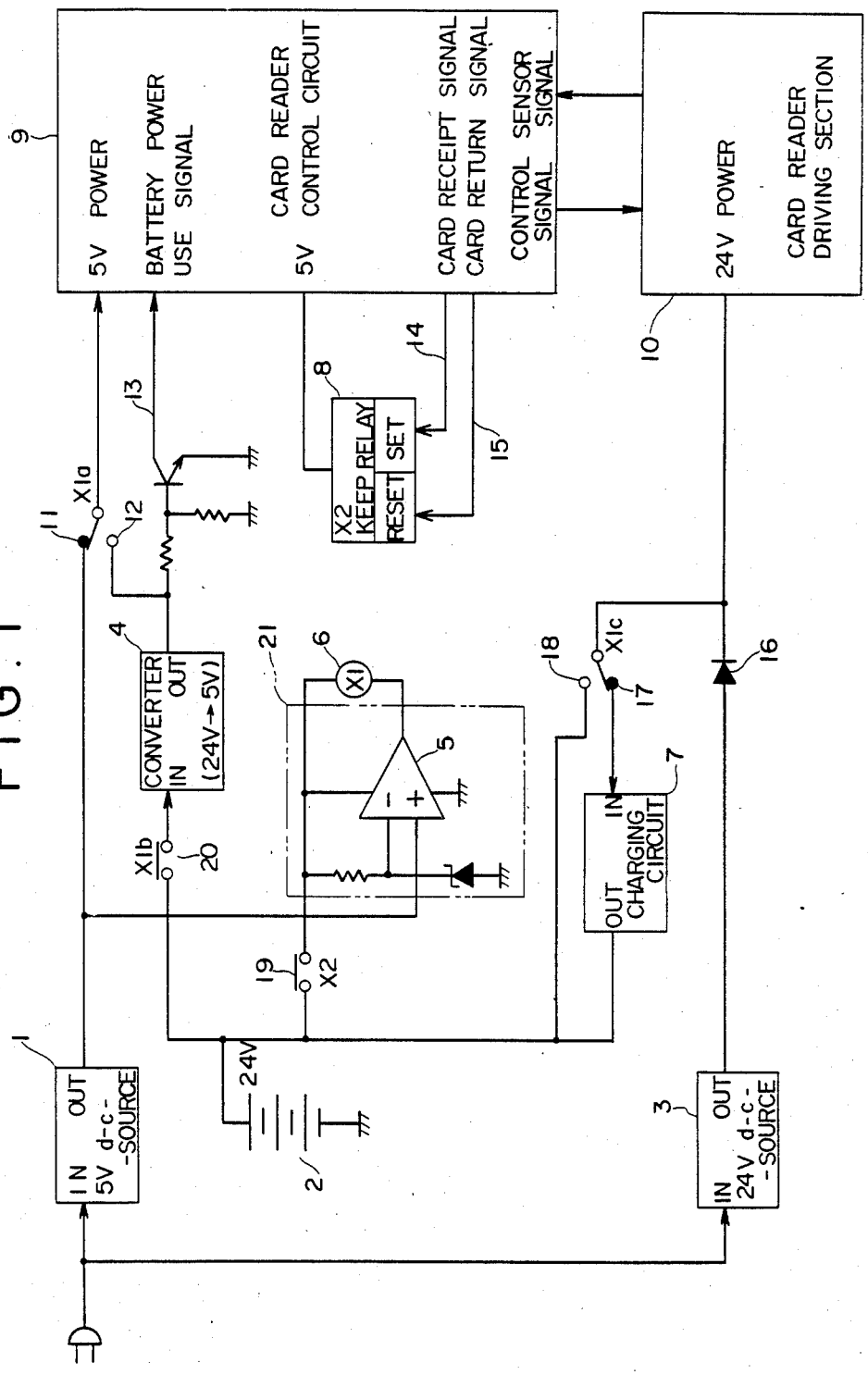
FIG. 1 is a schematic block diagram of a card reader as a preferred embodiment of this invention.

A card reader is illustrated in FIG. 1 as a preferred embodiments of this invention An a.c. power source is applied to a 5 V d.c. source 1 connected through a switch X1a to a 5 V power terminal of a card reader control circuit 9, and to a 24 V d.c. source 3 connected through a diode 16 to a 24 V power terminal of a card reader driving section 10. The 24 V d.c. source 3 is further connected through a switch X1c to a charging circuit 7 to charge a 24 volt rechargeable battery 2.

As the card reader driving section 10 receives a card inserted by an operator, a card receipt signal 14 is generated from the circuit 9 associated with the section 10 to set a keep relay 8 which serves a non-volatile storage means. In a card return mode, the inserted card is returned to its original position accessable by the operator, and a card return signal 15 is generated from the circuit 9 to reset the relay 8. Thus, the relay 8 remains set when an inserted card is within the card reader, and keeps its stage even if power failure occurs. The keep relay 8 may be replaced with a non-volatile solid state memory or the like, if desired.

As a card is inserted into the card reader, the relay 8 is set to close a switch X2 associated therewith which is connected with a power failure detection circuit 21, so that a voltage is supplied from the battery 2 to the circuit 21 to actuate the same. The circuit 21 includes a Zener diode for providing a reference voltage and a comparator 5 for comparing an output voltage from the source 1 with the reference voltage so that when the voltage from the source 1 is reduced below the reference voltage, the comparator 5 delivers an "L" output to actuate a relay 6.

When the relay 6 is actuated, the first switch X1a of the relay 6 turns a movable contact to a contact 12 for connection between a converter 4 and the 5 V power terminal of the circuit 9, a second switch X1b thereof is so closed to connect the battery 2 to an input terminal of the converter 4, and the third switch X1c thereof is so switched to connect the output terminal of the source 3 to an input terminal of the charging circuit 7 through the diode 16. Thus, the circuit 21 detects power failure, the switches X1a through X1c are actuated to supply a power from the battery 2 to the card reader control circuit 9 and the driving section 10.

Thus, as a card is inserted in the card reader supplied with an external a.c. source, the card reader driving section 10 conveys the card into a predetermined position to read the data. Further, the card reader control circuit 9 delivers a card receipt signal 14 to set the keep relay 8. After reading the card, the driving section 10 returns the card to its original position to dispense it to an operator or a card user and generates card return signal 15 for resetting the relay 8. When the card is taken in, the switch X2 of the relay 8 is so closed to bring the circuit 21 into a standby operation for detecting power failure.

When the output from the 5 V source 1 drops on power failure occurrence, the power failure detection circuit 21 energizes the relay 6 to turn the switch X1a to the contact 12, close the switch X1b and turn the switch X1c to the contact 18. Thus, the circuit 9 and the section 10 are interrupted to be supplied with power from the sources 1 and 3, but are supplied by the battery 2. The converter 4 delivers a 5 V d.c. voltage to the circuit 9 and provides the circuit 9 with a battery power use signal 13. Therefore, if power failure occurs when the relay 8 is set, the circuit 9 is supplied with 5 volt voltage power and the battery power use signal, and the section 10 is directly supplied by the battery 2. The circuit 9 is adapted to sense power failure occurring in a card taken-in mode of the section 10 so that the taken-in card be returned to its original position by the section 10 and the relay 8 reset by card return signal 15 delivered by the circuit 9. If the relay 8 is reset, the switch 19 is open to disenergize the relay 6 for interrupting power supply to the circuit 9 and the section 10. As a result, if power failure occurs when a card is taken in the section 10, the card is returned to its original position by such battery supply which ceases after completion of the return operation.

Figure 2:
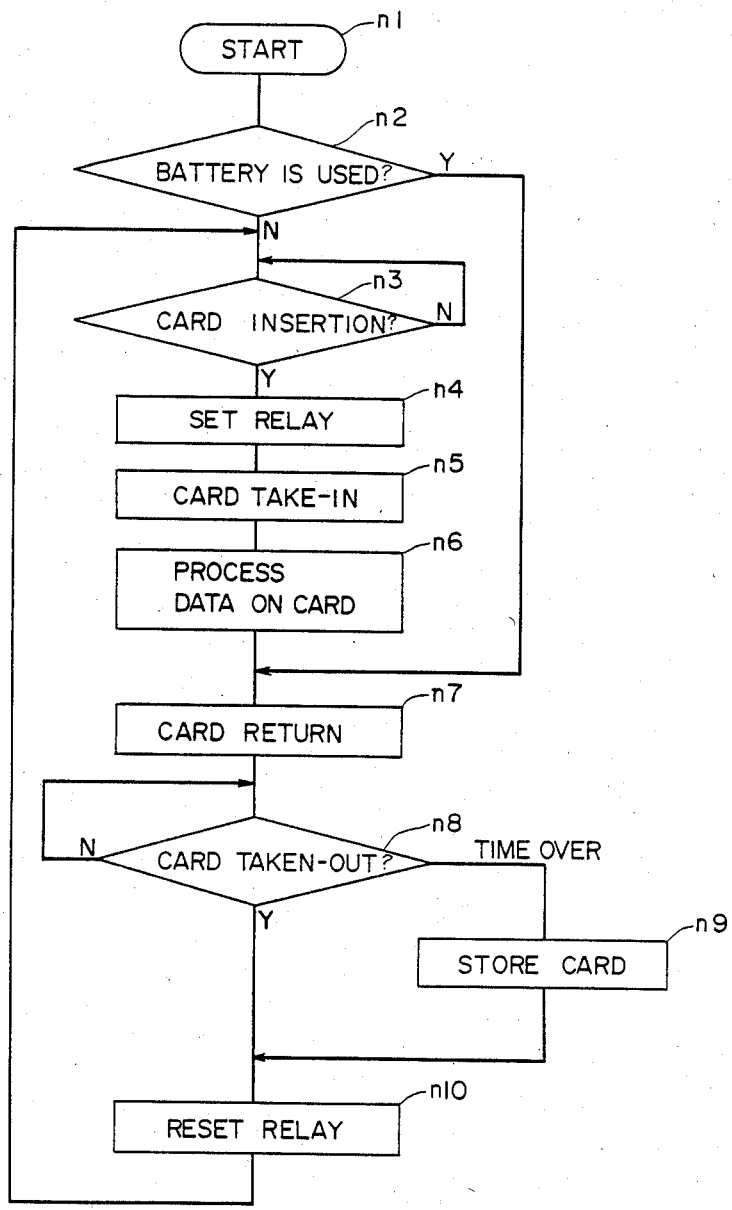
FIG. 2 is a flow chart illustrating operations of a card reading control of the card reader.

Returning to FIG. 2, the operations of the card control circuit 9 are illustrated. If the card reader is supplied with power from the external a.c. power source by a power switch (not shown in drawings) or from the battery 2 by power failure occurring, the operations of FIG. 2 start (step n1). In an inquiry step n2, the circuit 9 inquires if the battery power use signal 13 is applied to the circuit 9, which provides voltage source inquiring means of this invention. If no supply from the battery 2, a sequence will flow to a step n3 for a card receive standby mode. If a card is inserted, the keep relay 8 is set (step n4) to be taken into the card reader driving section 10 (step n5) which conveys the card to a predetermined position by a driving motor (not shown in drawings). The card is read or written with respect to data on a magnetic stripe of the card (step n6), and then the card is returned to its original position by the driving section 10 (step n7). If the returned card is taken out by an operator within a predetermined time period (step n8), it is stored into a predetermined storage location (step n9). If the card is taken out in the step n8 or stored in the step n9, the card return signal 15 is generated to reset the relay 8 (step n10), so that the sequence moves to the step where the circuit 9 waits for subsequent card insertion.

If power failure occurs during execution of above-mentioned operations, the sequence flows from the step n1 to step n7 in which the driving section 10 energized with the battery 2 returns any inserted card into its original position, if any. If the returned card is taken out within the predetermined time period or stored into the storage location, the relay 8 is reset to return the sequence from step n10 to step n3. After resetting the relay 8, power is not supplied to the circuit 9 or the section 10, so that a subsequent card cannot be conveyed to the predetermined position within the card reader by the disenergized section 10.

Figure 3:
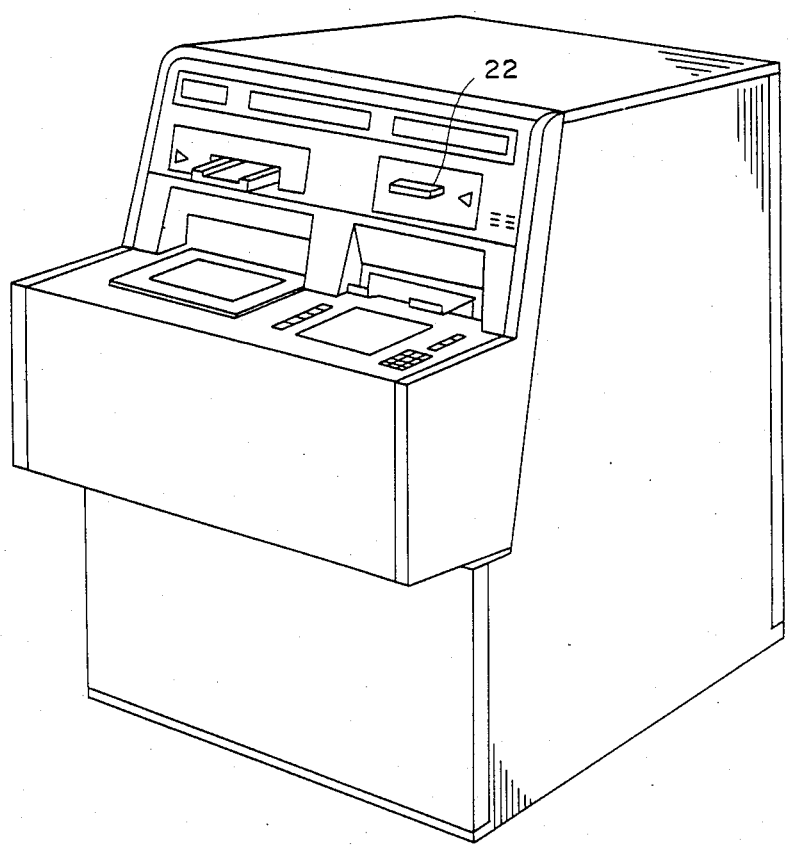
FIG. 3 is a slant view showing an automatic teller machine employing the card reader.

In FIG. 3, there is shown an automatic teller machine, having a card inlet 22 with which the card reader of FIG. 1 is associated. If the card is inserted through inlet 22 within the terminal for a predetermined operation, upon completion of the operation the inserted card is delivered out from the inlet 2. If power failure occurs during execution of a predetermined operation, the inserted card is rejected through the inlet 2 in accordance with the above-mentioned sequence.

Thus, any card inserted within the card reader is automatically returned to its original position by a back up battery, if power failure occurs. The card reader of this embodiment is for a magnetic stripe card, but may be modified to access a laser card or any other data media, if desired.

It should be understood that the above description is merely illustrative of this invention and that many changes and modifications may be made without departing from the scope of the appended claims.

What I claim is:

1. A card reader capable of conveying a card inserted therein to a predetermined position for accessing the card with respect to the data on the card, comprising
   non-volatile storage means adapted to be set when the inserted card is conveyed to the predetermined position and reset when the card is returned to its original position,
   power failure detecting means for detecting power failure when said non-volatile storage means is set, and
   driving means for returning the inserted card to its original position in response to an output generated from the power failure detecting means.

2. A card reader according to claim 1 further comprising
   controlling means for controlling operations for the card reader, and
   battery means for supplying said controlling means and said driving means with battery power in response to the output from said power failure detecting means.

3. A card reader according to claim 2 in which said battery means includes a rechargeable battery.

* * * * *